Dec. 18, 1945.  R. Y. KOPF  2,391,318
OIL FILTER
Filed Jan. 20, 1945  2 Sheets-Sheet 1

Inventor
Robert Y. Kopf,

By Clarence A. O'Brien
and Harvey B. Jacobson
Attorneys

Dec. 18, 1945.   R. Y. KOPF   2,391,318
OIL FILTER
Filed Jan. 20, 1945   2 Sheets-Sheet 2

Inventor
Robert Y. Kopf,
By Clarence A. O'Brien
and Harvey B. Jacobson
Attorneys Patented Dec. 18, 1945

2,391,318

UNITED STATES PATENT OFFICE 2,391,318

OIL FILTER

Robert Y. Kopf, Warren, Pa., assignor of one-half to Hammond Iron Works, Warren, Pa., and one-half to Katherine Cox Fulton and Hazel Fulton Pierce, both of Titusville, Pa.

Application January 20, 1945, Serial No. 573,659

1 Claim. (Cl. 210—154)

The present invention relates to a new and useful improvement in oil filters of a type disclosed in U. S. Letters Patent No. 1,547,315, dated July 28, 1925.

An important object of the present invention is to provide means for supporting the filtering elements in a manner so that the same may be easily and quickly removed for replacing, when necessary.

More specifically, the invention embodies a filtering element supporting member by means of which the filtering element may be installed and removed through the bottom of the filter.

Other objects and advantages reside in the details of construction and operation as more fully hereinafter described and claimed, reference being had to the accompanying drawings forming part hereof, wherein like numerals refer to like parts throughout, and in which Figure 1 is a vertical sectional view through the filter.

Figure 1:
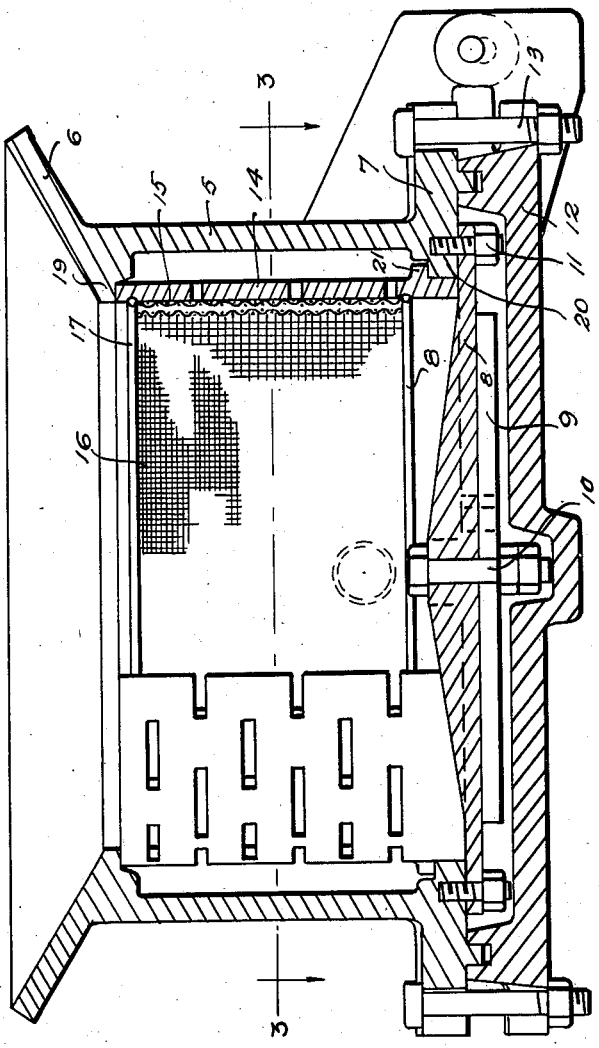
Figure 2:
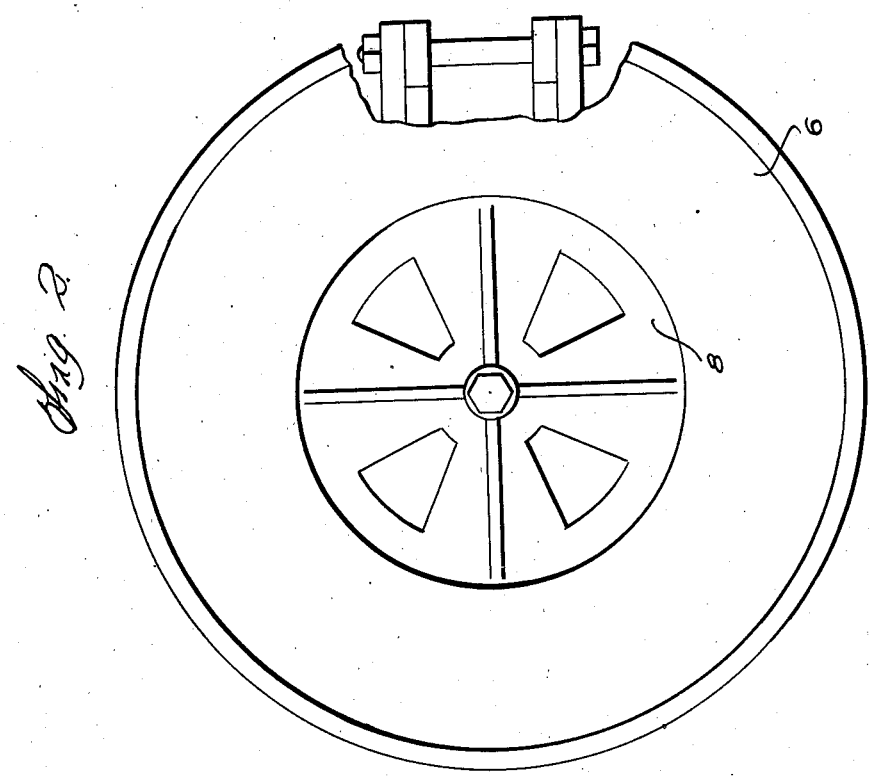
Figure 2 is a top plan view.
Figure 3:
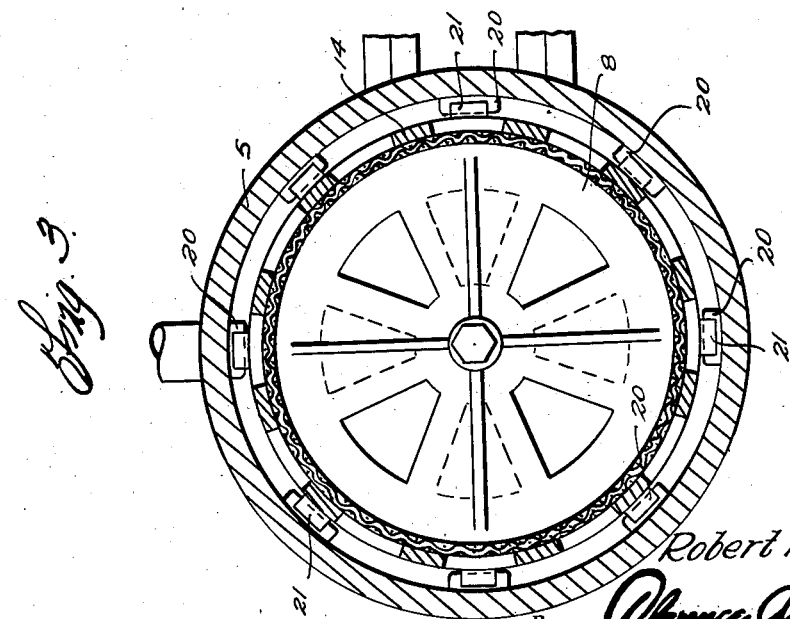
Figure 3 is a transverse sectional view taken substantially on a line 3—3 of Figure 1.

Referring now to the drawings in detail wherein for the purpose of illustration, I have disclosed a preferred embodiment of invention. The numeral 5 designates the annular filter housing which is in the form of an extension ring having upper and lower flanges 6 and 7, the upper flange being adapted for attaching to the bottom of a conventional filter tank by means of rivets or other suitable fastening devices.

The bottom of the housing 5 is closed by a conventional form of shutter type gate comprising upper and lower plates 8 and 9 secured together by the center bolt 10, the plates being provided with registerable openings (not shown) by rotating the lower plate 9 in order that the clay or other filter material may be withdrawn when necessary to clean or renew the filter, in a manner as explained in the aforesaid letters patent. The upper plate 8 is secured to the bottom of the housing 5 by means of bolts 11 and the plates 8 and 9 are enclosed by means of a cover plate 12 secured to the flange 7 by means of the bolts 13.

The filtering element comprises the perforated supporting ring 14 around the inner walls of which is placed the relatively coarse wire screen 15 and the relatively fine wire screen 16 retained in position by the upper and lower spring retaining rings 17 and 18, the upper edge of the supporting ring 14 abutting a shoulder or flange 19 projecting inwardly at the upper portion of the housing 5.

The lower portion of the housing 5 is formed with a plurality of circumferentially spaced inwardly projecting lugs 20 and the lower portion of the supporting ring 14 is likewise formed with outwardly projecting circumferentially spaced lugs 21.

In installing and removing the supporting ring 14 having the screen 15 and 16 attached thereto, the cover plate 12 and the plate 9 are removed and the supporting ring 14 of the filtering element is moved upwardly through the bottom of the housing 5 with the lugs 21 passing between the lugs 20. By partially rotating the supporting ring 14, the lugs 21 will then ride on top of the lugs 20 and support the supporting ring in position on the lugs 20 within the housing 5. The plates 8 and 12 are then replaced.

It is believed that the details of construction and manner of use of the device will be readily understood from the foregoing without further detailed explanation.

I claim:

In a filter, an annular housing having an open top forming a liquid inlet, and a side liquid outlet at the bottom thereof, an annular filter ring in said housing arranged concentrically therein and spaced therefrom for filtering liquid passing from the inlet to said outlet, an internal annular shoulder extending around the top end of said housing and against which the upper end of the ring is seated, inwardly projecting circumferentially spaced lugs on the bottom end of the housing, outwardly projecting circumferentially spaced lugs on the bottom end of the ring seating on the first named lugs, and means to close the bottom end of said housing, the first and second named lugs being spaced apart to provide for the second named lugs passing between the first named lugs whereby said ring is adapted to be inserted upwardly into said housing for turning to seat the second named lugs on those first named.

ROBERT Y. KOPF.